J. FOWLER, Jr., W. WORBY, & D. GREIG.
Steam-Plow.
No. 57,652.
Patented Aug. 28, 1866.
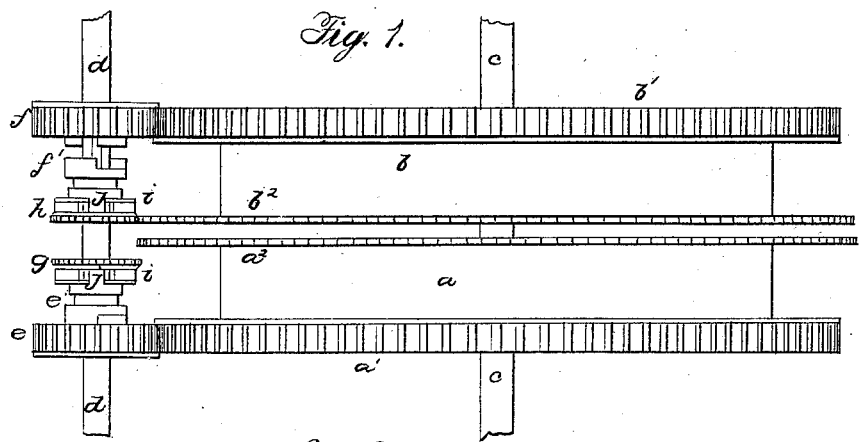
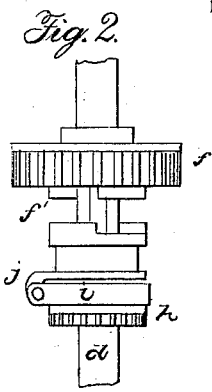

UNITED STATES PATENT OFFICE

JOHN FOWLER, JR., OF CORNHILL, WM. WORBY, OF IPSWICH, AND DAVID GREIG, OF NEW CROSS, COUNTY OF DEPTFORD, ENGLAND, ASSIGNORS TO WM. P. TATHAM, OF PHILADELPHIA, PENNSYLVANIA.

IMPROVEMENT IN STEAM-PLOWS.

Specification forming part of Letters Patent No. 57,652, dated August 28, 1866.

*To all whom it may concern:*

Be it known that we, JOHN FOWLER, Jr., of Cornhill, WILLIAM WORBY, of Ipswich, and DAVID GREIG, of New Cross, Deptford, England, have invented a new and useful Improvement in Machinery for Actuating Agricultural Implements by Steam-Power; and we do hereby declare that the following is a full, clear, and exact description thereof, reference being had to the accompanying drawings, making part of this specification, in which—

Figure 1 is an elevation of the said improved machinery, and Fig. 2 an elevation of a part thereof on a larger scale.

The same letters indicate like parts in both figures.

Our said invention relates to machinery for tilling land in which the implements are drawn across the field alternately from side to side by steam-engines on opposite headlands, which actuate a rope alternately in opposite directions, which rope is connected with the implement to be drawn.

In giving motion to agricultural implements by steam-engines on opposite headlands a hauling-rope is frequently employed, which is put in motion by being wound upon drums first at one end and then at the other, one of the drums winding up the rope at one end, while the other drum allows the rope at the other end to be drawn off from it. Now, when such an arrangement is adopted it is found necessary to check the revolution of the drum off which the rope is being drawn, in order to prevent the rope becoming slack and falling down on the land, as, were it allowed to do so, its rapid motion while resting on the land would rapidly destroy it. This drum, therefore, has usually been checked by means of a brake, a considerable amount of power being thereby uselessly expended.

Now, according to our said invention the drum from which the rope is being drawn is geared with the drum which is winding up the rope in such a manner that the former, in revolving, tends to drive the latter at a greater speed than that at which it itself revolves, and a friction apparatus is interposed between the two, which, by slipping when a sufficient strain is put on it, allows the drum from which the rope is drawn to revolve, when necessary, as fast or faster than the winding-drum; but, as it has a tendency to revolve at all times at a considerably slower speed, the rope, as it passes from the winding apparatus, is kept tight, and this is done with but little expenditure of power, as the same friction which holds back the drum from which the rope is being drawn assists in driving the winding-drum.

In the accompanying drawings, $a$ and $b$ are the two winding-drums. They are both mounted so that they can revolve freely on the shaft $c$, and they have toothed wheels $a'$ and $b'$ fixed to them. $d$ is a vertical shaft, driven by the steam-engine in the known or any appropriate manner, and $e$ and $f$ are pinions mounted loosely on the shaft $d$, but capable of being clutched to it by the ordinary clutches $e'$ and $f'$. As the pinions $e$ and $f$ gear into the spur-wheels $a'$ and $b'$ on the drums, either of these drums can be driven so as to wind up the rope by clutching the appropriate pinion to the shaft $d$. Each of the drums $a$ and $b$ has also cogs $a^2$ $b^2$ on its flange, and on the shaft $d$ are corresponding pinions $g$ and $h$, which can both turn and slide freely thereon. Around a boss attached to each of these pinions a friction-strap, $i$, passes, which is capable of being tightened up by a screw in the usual manner, as may be required, and between the two ends of the friction-strap a lug, $j$, projecting from the clutch next to it, enters, and the tightening-screw passes through it.

It will thus be seen that, when one of the driving-pinions—say the pinion $e$—is clutched to its shaft $d$ and the other driving-pinion—say $f$—is at the same time thrown out of gear, the pinion $g$, which is connected with the clutch of the pinion $e$, is moved so as to be out of gear with the cogs $a^2$ on the flange of the drum $a$, and the corresponding pinion $h$ is thrown into gear with the teeth $b^2$ of the drum $b$, from which latter drum, when the engine is put in motion, the rope is to be drawn off. The rope being drawn from this drum causes it to revolve, and, indeed, were there no rope on it, it would be driven by the pinion $h$, but at a lower speed than is required when there is rope upon it, to unwind the rope, (even when the winding-drum $a$ has no rope coiled on it and the other drum, $b$, has several layers of rope upon it.) Consequently the rope can only be drawn off by causing the pinion *h* to turn in its friction-strap, the friction-strap itself being unable to turn more rapidly than the shaft *d*, the clutch to which it is connected being incapable of turning independently of the shaft *d*. Consequently the clutch, tending constantly to revolve quicker than the shaft, helps to drive it. When the motion of the hauling-rope is to be reversed the other clutch and pinion are thrown into gear, while those previously at work are thrown out, the engine also being reversed.

What we claim as our invention, and desire to secure by Letters Patent in machinery for actuating agricultural implements by steam-power, is—

Combining the two drums which alternately wind up and let off the rope by which the agricultural implement is drawn with the driving-shaft of the steam-engine or equivalent motor by means of the cogged or toothed wheels on the drums, the two sets of pinions on the driving-shaft, and the clutches and friction-straps, or the equivalents thereof, substantially as and for the purpose specified.

JOHN FOWLER, Jun.
WM. WORBY.
D. GREIG.

Witnesses:
EDWIN EDDISON,
    *Attorney and Notary Public, Leeds.*
B. CHEATLE,
    *Of Leeds, his clerk.*